Oct. 20, 1964  R. K. NELSON ETAL  3,153,464
AUTOMOTIVE DRIVE AXLE
Filed Nov. 23, 1962  2 Sheets-Sheet 1

INVENTORS
ROBERT K. NELSON
ANDREW J. NENADAL
BY Williams, David,
Hoffmann & Yount.
ATTORNEYS

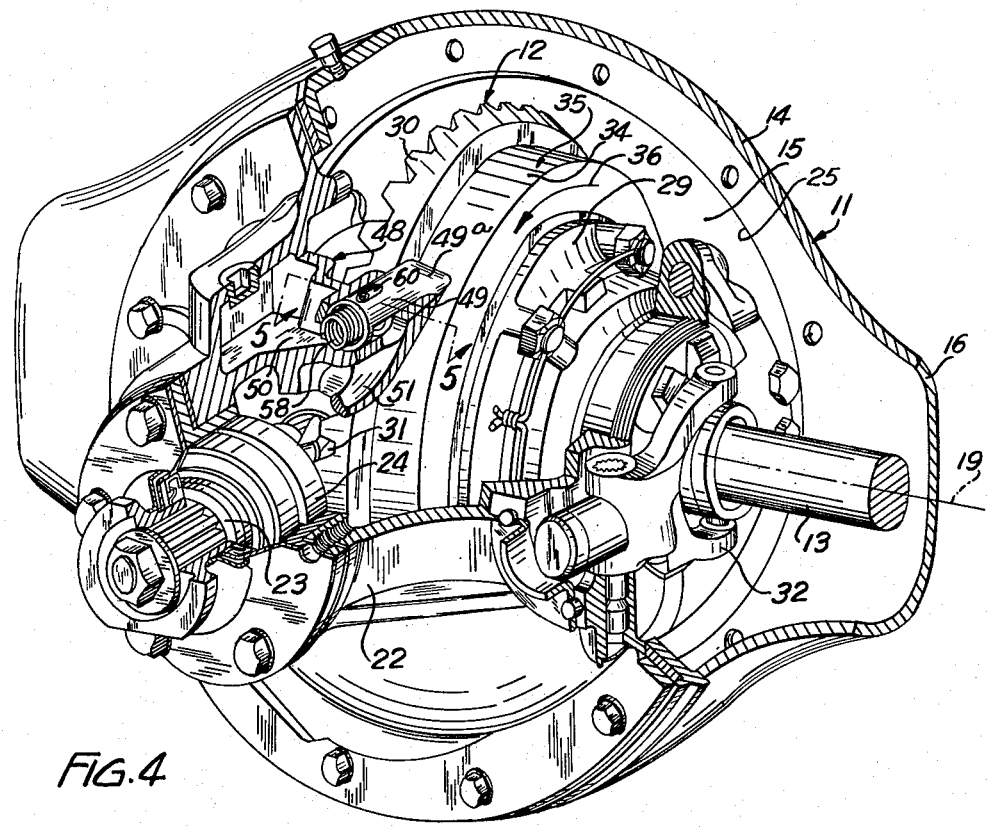
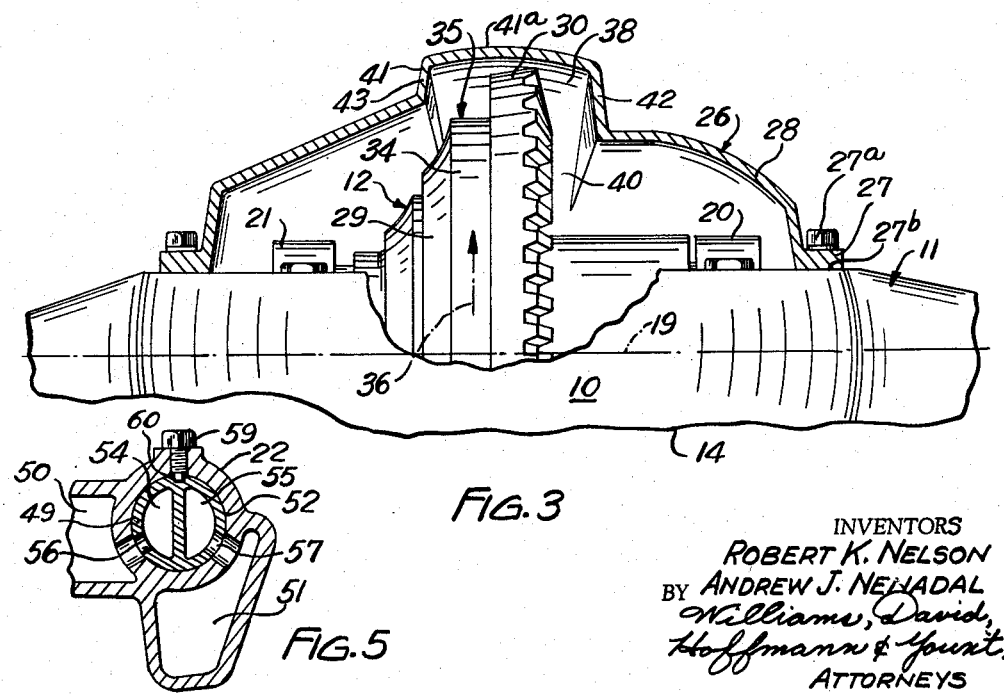

ns, 3,153,464
Patented Oct. 20, 1964

3,153,464
AUTOMOTIVE DRIVE AXLE
Robert K. Nelson and Andrew J. Nenadal, Cleveland, Ohio, assignors to Eaton Manufacturing Company, Cleveland, Ohio, a corporation of Ohio
Filed Nov. 23, 1962, Ser. No. 239,504
11 Claims. (Cl. 184—11)

This invention relates to automotive drive axles and, more particularly, to a novel construction for achieving more effective lubrication in such an axle.

It has long been known that the ring gear of an automotive drive axle acts as a lubricant pick-up means for delivering lubricant from a lower reservoir to an elevated location for distribution to different portions and components needing lubrication. It has also been known that distribution of the picked-up lubricant can be achieved by having a portion of the ring gear extend into a cover recess having side walls diverging transversely thereof for directing the lubricant toward the bearings which support the differential unit.

Adequate lubrication in an automotive drive axle is extremely important, particularly in a truck axle where the moving parts and support surfaces are subjected to heavy loads and pressures. The present invention aims to achieve, as one of its objects, more effective lubrication in such a drive axle by the provision of a novel construction which renders the pick-up means able to lift and deliver an increased amount of lubricant for distribution to the parts and surfaces needing lubrication.

Another object is to provide a novel drive axle in which a portion of a rotatable gear unit movable through a lubricant reservoir and into an upwardly extending channel recess of the housing wall carries lubricant into the recess, and wherein, a tapered shape for the recess longitudinally thereof greatly increases the action of such gear unit portion in lifting lubricant and advancing the same along the recess to thereby enable the pick-up means to supply a large volume of lubricant to a receiver means for distribution.

Still another object is to provide such a novel drive axle in which the recess has a wide lower end adjacent the reservoir and is of a progressively converging width therealong toward a narrow upper discharge end so that wedging of lubricant into the recess by the upward movement of the pick-up portion of the gear unit increases the lift action thereof on the lubricant whereby a large volume of lubricant is lifted and made available for distribution.

Additionally, this invention provides such a novel drive axle wherein the housing has an access opening and the wall portion containing the upwardly converging channel recess comprises cover means closing such opening.

Other objects, novel characteristics and advantages of this invention will be apparent in the following detailed description and in the accompanying drawings forming a part of this specification and in which, FIG. 1 is a perspective view of the rear side of the central gear housing portion of an automotive drive axle embodying the novel construction of this invention;

FIG. 3 is a partial horizontal section taken on section line 3—3 of FIG. 2;

FIG. 4 is a perspective view of the axle from the front side of the gear housing portion and with portions of the gear housing broken away; and FIG. 5 is a fragmentary sectional view of a lubricant scoop means taken on section line 5—5 of FIG. 4.

Figure 1:
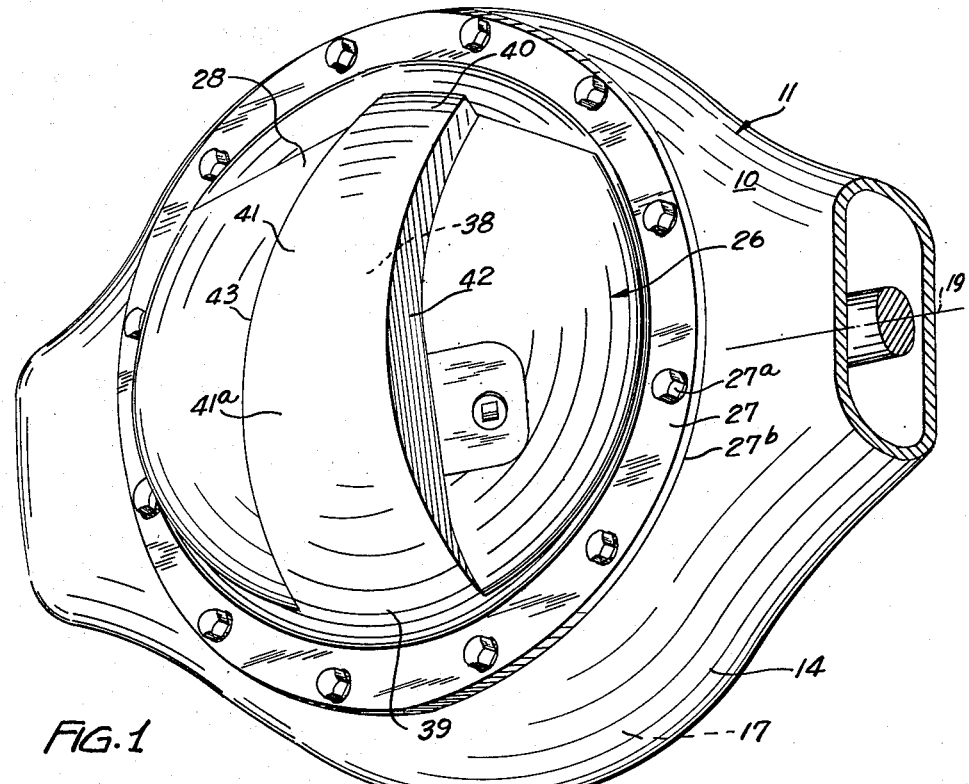
Figure 2:
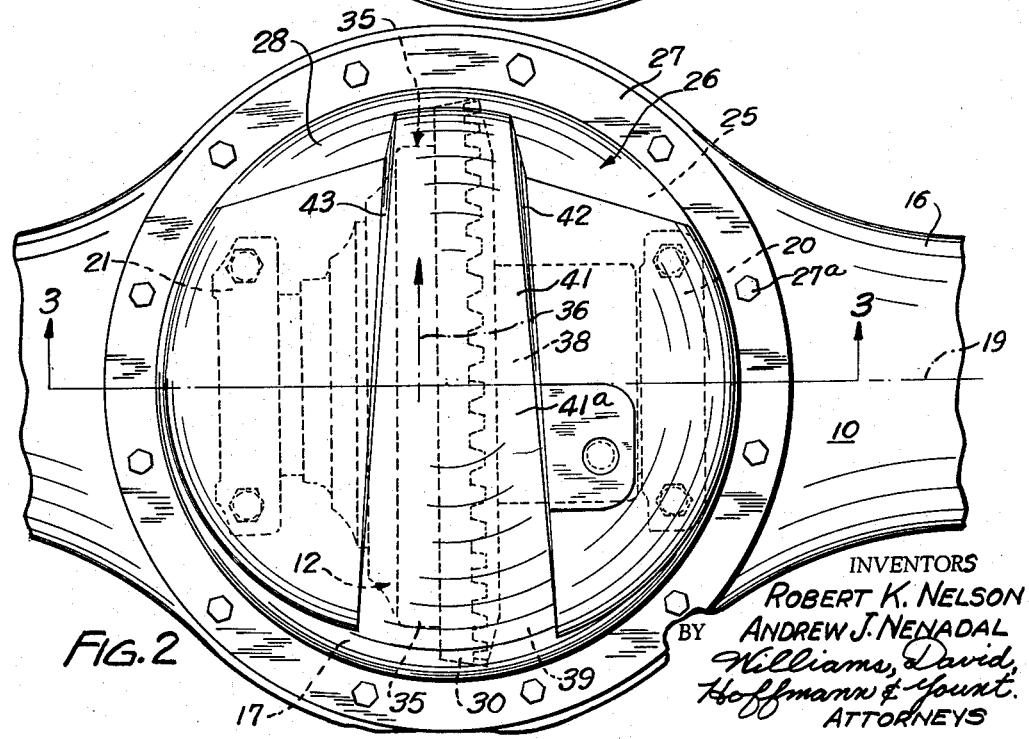
FIG. 2 is a rear elevation of such gear housing portion.

The accompanying drawings show an automotive drive axle 10 embodying the novel construction provided by this invention and by which more effective lubrication of mechanism of the axle is achieved. The axle 10 comprises, in general, a housing 11 and a differential gear unit 12 operable therein for delivering torque to traction wheels through axle shafts 13 projecting laterally in opposite directions from the gear unit.

The housing 11 has an enlarged central portion 14 containing a gear chamber 15 in which the gear unit 12 is operable, and tubular portions 16 projecting in laterally opposite directions from the central portion and through which the axle shafts 13 extend. The lower portion of the gear chamber 15 provides a reservoir 17 adapted to contain a supply of lubricant for use in lubricating the various axle components located in such gear chamber.

The central housing portion 14 contains a pair of laterally spaced bearings 20 and 21 which support the gear unit 12 in the chamber 15 for rotation on a rotation axis 19 which is also the rotation axis of the axle shafts 13. The central housing portion 14 includes a projection 22 on the forward side thereof in which is located a pinion shaft 23 and a bearing 24 for rotatably supporting such pinion shaft. On the rear side thereof the central housing portion 14 is provided with an access opening 25 leading into the gear chamber 15 and through which the gear unit 12 can be introduced into such chamber.

A cover member 26 is removably connected with the central housing portion 14 by suitable clamping screws 27a for closing the access opening 25. The cover member 26 comprises a wall 28 of a concavely dished shape on the gear-chamber side thereof and an annular marginal flange 27 through which the screws 27a extend.

The assembled position of the cover member 26 is with the flange 27 clamped against a flat annular clamping surface 27b provided on the housing portion 14 and lying in a vertical plane offset rearwardly from the rotation axis 19.

The gear unit 12 is of a conventional construction and is here shown as having a gear case 29 containing suitable planetary gearing for transmitting torque to the axle shafts 13 and a ring gear 30 connected with the gear case and located externally thereof. The ring gear 30 is shown as being a bevel gear and the pinion shaft 23 is here shown as having a bevel pinion 31 mounted thereon and disposed in meshed driving engagement with the ring gear. The gear unit 12 is here shown as being of the change-speed type and as having shift means 32 operable to shift from one axle speed to another.

The gear unit 12 includes an annular drum member 34 formed on, or connected with, the gear case 29 and extending therearound in an adjacent relation to one side of the ring gear 30. The ring gear 30 and the drum member 34 together constitute a lubricant pick-up means 35 extending down into and movable through the reservoir 17. The pick-up means 35 is effective in a manner to be explained hereinafter for picking up lubricant from the reservoir 17 and making such lubricant available for distribution to the bearings and other axle components needing lubrication and located in the housing portion 14.

The operating life of the drive axle 10 depends directly upon the amount of lubrication supplied to the bearings and moving parts of the mechanism and this, in turn, depends upon the effectiveness of the lubricant pick-up means 35 in lifting lubricant from the reservoir 17 to an elevated location from which it can be distributed to such bearings and moving parts. The direction of rotation of the gear unit 12 in the chamber 15 is that indicated by the arrow 36 from which it will be seen that, as the lower portion of the pick-up means 35 moves through and leaves the reservoir 17, its travel is in an upward direction for the portion of the pick-up means located on the rearward side of the drive axle 10.

The wall portion of the housing 11 on the rearward side of the gear unit 12, in this case the cover member 26, is provided with an upwardly extending channel recess 38 through and along which the pick-up means 35 moves during the operating rotation of the gear unit in the chamber 15. As the pick-up means 35 moves out of the reservoir 17 and into the channel recess 38, lubricant clings to the pick-up means and is thus carried into the channel recess.

Drive axles have heretofore sometimes been provided with a channel recess in the rear cover of the housing thereof and portions of a rotating gear unit have extended into such channel recess and have operated as a lubricant pick-up means for carrying lubricant thereinto from a lower reservoir portion of the gear chamber. The channel recess as heretofore provided, however, has been of a substantially uniform cross-sectional width therealong and a substantial portion of the lubricant carried into the recess by the pick-up means simply dropped by gravity back into the reservoir. Only a small portion of the lubricant remained on the pick-up means to be elevated thereby to a suitable location, or to a receiver means, for distribution to the bearings and moving parts needing lubrication.

To achieve maximum effectiveness of the pick-up means 35 in elevating lubricant from the reservoir 17, this invention provides the channel recess 38 of such a shape that a major portion of the lubricant carried thereinto by the pick-up means will be advanced along the recess in such a manner as to remain on the pick-up means and be carried by the latter to a receiver means located at a suitably high elevation for good distribution of the lubricant to the bearings and moving parts needing the same. For this purpose the channel recess 38 is of a progressively narrowing width therealong, as shown in the drawings, and is disposed with the wide lower inlet end 39 thereof adjacent the reservoir 17 and the narrow upper discharge end 40 thereof located near the top portion of the pick-up means 35.

The channel recess 38 extends in an upward arcuate direction following the curved contour of the concavely dished side of the cover member 26 and is preferably obtained by forming an upwardly converging hollow rib 41 in the convexly curved wall 28. The rear wall 41ᵃ of the rib 41 extends in an arcuate relation part way around the rotation axis 19 of the gear unit 12 and forms the bottom wall of the channel recess 38. The sides 42 and 43 of the hollow rib 41 form the side walls of the channel recess 38 and are here shown as being substantially flat wall portions disposed so that they converge progressively along the channel recess 38 from the wide lower end 39 thereof to the narrow upper end 40 thereof.

The side wall portions 42, 43 can, if desired, lie in planes which are substantially perpendicular to the plane of the clamping surface 27ᵇ against which the cover member 26 is secured, but preferably and as shown in the drawings, the side wall portions 42, 43 lie in oppositely inclined planes to facilitate the formation of the hollow rib 41 on the cover member by conventional sheet-metal-working die apparatus. The planes of the side wall portions 42, 43 are thus inclined in two directions, namely, along and across the hollow rib 41. The inclination along the hollow rib 41 provides the above-described progressively narrowing width of the channel recess 38. The inclination across the hollow rib 41 appears as a divergence, at a small angle, in a direction toward the plane of the clamping surface 27ᵇ. The vertical length of the hollow rib 41 is such that the narrow upper discharge end 40 of the channel recess 38 is located a substantial distance above the horizontal plane containing the rotation axis 19 and near the top portion of the pick-up means 35.

When the channel recess 38 is of the converging width therealong as shown in the drawings and described above, the lubricant carried into the recess by the pick-up means 35 is advanced therealong toward the discharge end 40 with a wedging movement of the lubricant between and against the converging side wall portions 42 and 43. This causes the lubricant to adhere more strongly to the pick-up means so that very little of the lubricant drops back into the reservoir 17. This stronger adherence and resulting increased volume of lubricant clinging to the pick-up means causes the channel 38 to be more completely filled with lubricant, and consequently, the farther along the recess the pick-up means moves in the upward direction, the more effective the wedging action will be and the more effective the pick-up means will be in lifting and advancing the lubricant in such recess.

Since the discharge end 40 of the channel recess 38 is located near the top of the pick-up means 35, the lubricant moving out of the recess with the pick-up means will lie on the top portion of the latter and the action of gravity on such lubricant will be to assist in retaining the same on the pick-up means. This gravity action in assisting the lubricant to remain on the pick-up means will continue to be effective as the lubricant is carried through the sector of travel corresponding with the extreme top portion of the arcuate path of movement of the pick-up means.

The drive axle 10 includes receiver means 48 for receiving lubricant from the pick-up means 35 for distribution to the bearings 20, 21 and 24 and to the moving parts of the axle mechanism. The receiver means 48 is located in the forward projection 22 of the axle housing 11 and includes scoop means 49 extending into a co-operative relation with the drum member 34 of the pick-up means 35. The receiver means 48 also includes a lubricant chamber 50 and a lubricant flow passage 51. The lubricant chamber 50 delivers lubricant, through a suitably provided passage, to the bearing 20 from which it passes into and through the gear case 29 for lubrication of the gear members in the latter. In leaving the gear case 29 the lubricant passes through the bearing 21 and returns to the reservoir 17. The lubricant flow passage 51 conducts lubricant to the pinion shaft bearing 24 from which it returns to the reservoir 17.

The scoop 49 is here shown as being a tubular member slidably mounted in a guide opening 52 of the housing projection 22 and having a free open end 49ᵃ in a closely spaced co-operative relation to the drum member 34 for scooping lubricant therefrom. The scoop member 49 is closed at its forward end and contains two longitudinal passages 54 and 55 of which the passage 54 delivers lubricant to the chamber 50 through a radial opening 56 and the passage 55 delivers lubricant into the flow passage 51 through a radial opening 57.

A compression spring 58 is suitably mounted on the projection 22 and is effective against the closed forward end of the scoop member 49 for continuously urging the open end of this member toward its co-operative relation with the drum member 34. A screw 59 mounted in the projection 22 extends into a longitudinal slot 60 of the scoop member 49 for fixing the rotational position of the member 49 on its own axis and thus correctly positioning the open end 49ᵃ in the desired co-operative scoop relation to the drum member.

From the novel construction shown in the accompanying drawings and described above for the drive axle 10 it will now be readily understood that the provision of the progressively narrowing channel recess 38, into and along which the pick-up means 35 is movable for carrying lubricant thereinto from the reservoir 17, causes a more effective lifting and advancing of lubricant from the reservoir to an elevated distribution point or to a receiver means from which such lubricant can be readily supplied to the bearings and moving parts of the axle mechanism. It will now also be understood that the wedging of the lubricant into the longitudinally convergent channel recess 38 results in a stronger adherence for the lubricant on the pick-up means and a more complete filling of the recess by the lubricant. As the result of these characteristics the pick-up means 35 will operate as a pumping means for effectively lifting lubricant from the reservoir 17 and advancing it to an elevated distribution point.

Since the channel recess 38 extends arcuately along the pick-up means 35 for a substantial angular distance, the hollow rib 41 will retain the lubricant against being thrown off the pick-up means by centrifugal force until lubricant has been elevated to the point where gravity will assist in retaining the lubricant on the top portion of the pick-up means.

Because of the construction and functioning hereinabove described, the delivery of a large volume of lubricant will be achieved and the drive axle 10 will accordingly be capable of rendering heavy duty service for a prolonged period.

Although the automotive drive axle of this invention has been illustrated and described herein to a somewhat detailed extent it will be understood, of course, that the invention is not to be regarded as being limited correspondingly in scope but includes all changes and modifications coming within the terms of the claims hereof.

Having described our invention, we claim:

1. In an automotive axle; a housing having an opening in one side thereof; said housing containing a gear chamber accessible through said opening and including a lubricant reservoir in the lower portion of said chamber; a power transmitting gear unit rotatable in said chamber and having an annular portion movable through said reservoir as a lubricant pick-up means; a cover closing said opening; said cover having an upwardly extending channel recess on the inner side thereof and through which said pick-up means is movable in an upward direction during rotation of said unit; said recess having a lower end adjacent said reservoir for carrying of lubricant thereinto from the reservoir by said pick-up means, and an upper discharge end at an elevation above said reservoir for discharging lubricant to be distributed; and means for receiving lubricant from said pickup portion for delivery to different locations in said housing; said recess being of a converging width therealong between its lower and upper ends so that wedging of lubricant thereinto by the upward movement of said pick-up means increases the lift action of the latter on the lubricant.

2. An automotive axle according to claim 1 wherein said cover is of concave shape on the inside thereof, and wherein said recess extends along and follows said concave shape.

3. An automotive axle according to claim 1 wherein said gear unit has a rotation axis located substantially in the horizontal mid-plane of said housing; said recess extending across said mid-plane and being of a length so that said lower and upper ends are located substantial distances below and above said mid-plane.

4. In an automotive drive axle; a housing containing a gear chamber and a lubricant reservoir in the lower portion of said chamber; a gear unit rotatable in said chamber for transmitting torque from a power input means to a power output means and having an annular portion movable through said reservoir as a lubricant pick-up portion; said housing having a side wall on one side of said chamber and a channel recess in said side wall and extending therealong in an upward direction away from said reservoir; said recess having its lower end adjacent said reservoir for carrying of lubricant thereinto from said reservoir by said pick-up portion; said recess also having an upper discharge end and being of a length to locate said discharge end adjacent the top sector of said pick-up portion; and means for receiving lubricant from said pickup portion for delivery to different locations in said housing; said channel being of a converging width therealong between its lower and upper ends so that wedging of lubricant thereinto by said pickup portion increases the lift action of the latter on the lubricant.

5. In an automotive drive axle; a housing containing a gear chamber and a lubricant reservoir in the lower portion of said chamber; a gear unit rotatable in said chamber for transmitting torque from a power input means to a power output means and having an annular portion movable through said reservoir as a lubricant pick-up portion; said housing having a side wall on one side chamber and a channel recess in said side wall and extending therealong in an upward direction away from said reservoir; said recess having its lower end adjacent said reservoir for carrying of lubricant thereinto from said reservoir by said pick-up portion and said recess also having an upper discharge end; and receiver means for receiving lubricant from said pick-up portion at a point beyond said upper end for delivery to different locations in said housing; said recess being of a converging width therealong between its lower and upper ends so that wedging of lubricant thereinto by said pick-up portion increases the lift action of the latter on the lubricant.

6. In an automotive drive axle; a housing containing a gear chamber and a lubricant reservoir in the lower portion of said chamber; a gear unit rotatable in said chamber for transmitting torque from a power input means to a power output means and having an annular portion movable through said reservoir as a lubricant pick-up portion; said housing having a side wall on one side chamber and a channel recess in said side wall and extending therealong in an upward direction away from said reservoir; said recess having its lower end adjacent said reservoir for carrying of lubricant thereinto from said reservoir by said pick-up portion and being of a length so that lubricant discharged from said channel at the upper end thereof lies on the top sector of the pick-up portion with the force of gravity assisting the lubricant in clinging to said top sector; and receiver means for receiving lubricant from said pick-up portion at a point beyond said upper end for delivery to different locations in said housing; said recess being of a converging width therealong between its lower and upper ends so that wedging of lubricant thereinto by said pick-up portion increases the lift action of the latter on the lubricant.

7. An automotive drive axle according to claim 6 wherein said side wall is concave on the gear-chamber side thereof; said recess being in the concave side of said side wall and in a following relation to the curvature thereof.

8. In an automotive drive axle; a housing containing a gear chamber and a lubricant reservoir in the lower portion of said chamber; a rotatable driving means in said housing; a rotatable driven means in said housing; a gear unit rotatable in said chamber for connecting said driving means with said driven means; said unit having a portion movable through said reservoir as a lubricant pick-up portion; and receiver means at an elevation above said reservoir for receiving lubricant for distribution to desired locations in said housing; said housing having a side wall on one side of said chamber and a channel recess in said side wall and extending therealong in an upward direction away from said reservoir and toward said receiver means; said recess having a wide lower end into which said pick-up portion is movable for carrying lubricant thereinto from said reservoir and being of a converging width upwardly therealong from said lower end whereby said pick-up means lifts and advances the lubricant along said channel toward said receiver means.

9. In an automotive drive axle; a housing containing a gear chamber including a reservoir for lubricant; bearings in said housing providing a rotation axis; a gear unit in said chamber and supported by said bearings for rotation on said axis; power input means connected with said unit to rotate the same; power output means connected with said unit to be driven thereby; said unit having a portion movable through said reservoir as a pick-up portion for contact with said lubricant; and receiver means at an elevation above said reservoir for receiving lubricant for distribution to different locations in said housing; the movement of said pick-up portion out of said reservoir being along a curved path extending in an upward direction on one side of said chamber and part-way around said axis toward said receiver means;

said housing having wall portions defining a channel recess extending along said curved path and into which said pick-up portion is movable for carrying lubricant thereinto from said reservoir; said recess being of a tapered shape so that the width thereof, measured along lines extending thereacross substantially parallel with said axis, is progressively narrower for the direction of movement of said pick-up portion along the recess.

10. An automotive drive axle according to claim 9 wherein said housing has an access opening in the rear side thereof; and a cover closing said opening and having a concave side presented toward said unit; said wall portions and channel recess being on said cover and extending along the curvature of the concave side thereof.

11. In an automotive drive axle; a housing containing a gear chamber and a lubricant reservoir in the lower portion of said chamber; a rotatable driving means in said housing; a rotatable drive means in said housing; a gear unit rotatable in said chamber for connecting said driving means with said driven means; said unit having a lubricant pick-up portion movable in a path through said reservoir; receiver means in said housing for receiving lubricant from said pick-up portion for delivery to locations in said housing; means defining a channel extending along at least a part of said path in an upward direction away from said reservoir; said channel having a wide lower end into which said pick-up portion is movable for carrying lubricant thereinto from said reservoir and being of a converging width upwardly therealong from said lower end whereby said pick-up means lifts and advances the lubricant along said channel toward said receiver means.

References Cited in the file of this patent
UNITED STATES PATENTS
2,182,889    Carlson et al. _____ Dec. 12, 1939

UNITED STATES PATENT OFFICE
CERTIFICATE OF CORRECTION

Patent No. 3,153,464                           October 20, 1964

Robert K. Nelson et al.

It is hereby certified that error appears in the above numbered patent requiring correction and that the said Letters Patent should read as corrected below.

Column 7, line 18, for "drive" read -- driven --.

Signed and sealed this 9th day of March 1965.

(SEAL)
Attest:

ERNEST W. SWIDER                              EDWARD J. BRENNER
Attesting Officer                                  Commissioner of Patents